March 22, 1966
C. L. GUILD ETAL
3,241,326
CLAMPS FOR ATTACHING EARTH ENTERING ELEMENTS
TO DRIVING ELEMENTS Filed Sept. 4, 1962
10 Sheets-Sheet 4

Inventors:
Charles L. Guild,
Willard B. Goodman,
by
Attorney

Fig. 8.

Inventors:
Charles L. Guild,
Willard B. Goodman
by [signature]
Attorney

March 22, 1966

C. L. GUILD ETAL 3,241,326

CLAMPS FOR ATTACHING EARTH ENTERING ELEMENTS TO DRIVING ELEMENTS

Filed Sept. 4, 1962

Inventors:
Charles L. Guild,
Willard B Goodman
by
Attorney

March 22, 1966  C. L. GUILD ETAL  3,241,326
CLAMPS FOR ATTACHING EARTH ENTERING ELEMENTS
TO DRIVING ELEMENTS
Filed Sept. 4, 1962  10 Sheets-Sheet 8

Inventors:
Charles L. Guild,
Willard B. Goodman,
by
Attorney

United States Patent Office 3,241,326
Patented Mar. 22, 1966

3,241,326
CLAMPS FOR ATTACHING EARTH ENTERING ELEMENTS TO DRIVING ELEMENTS
Charles L. Guild, Rumford, R.I., and Willard B. Goodman, Sherman Oaks, Calif., assignors to Shell Oil Company, New York, N.Y., a corporation of Delaware
Filed Sept. 4, 1962, Ser. No. 221,290
18 Claims. (Cl. 61—63)

The present invention relates to combinations of earth entering elements and clamps for use in attaching such earth entering elements to the driving element, particularly when the member for driving or withdrawing the element is actuated by a vibration generator, especially where the frequencies of the generated vibrations are in the sub-sonic or sonic ranges.

As pointed out in our co-pending application, Serial No. 160,442, filed December 19, 1961, now abandoned, pile driving or pile removal by vibrations within the above generally defined frequency ranges requires that the pile be securely clamped to the driving member without interfering with the functions of the vibrations. The same requirements exist with various other earth entering elements of which well casings and pipes are other typical examples but the invention is herein primarily discussed with reference to piles. Several types of piles are commonly used and the present invention is concerned with clamps useable with a wide variety of piles or other earth entering elements.

The principal objective of the invention is to provide a clamp for the endwise clamping of earth entering elements and in accordance with the invention, this objective is attained by providing a receiver for the earth entering element, the receiver including at least one backing portion. A double-acting ram has a head portion which is movable from a first position toward the backing portion and there is a connection between the earth entering element and one of the above mentioned portions, the connection including a member that is loose and disengageable in the first position of the ram head and becomes tightly interengaged on such movement of the ram head portion thus to exert endwise clamping pressure on the element to clamp it against the backing portion of the receiver.

Another objective of the invention is to provide a connection in which the element and the portion of the receiver or of the ram head connected thereto have holes that are transversely alined in the first position of the ram head thus to enable a keeper to be inserted therethrough. The holes are preferably ovate with their long axes vertical and the keeper is preferably in the form of a cylindrical sleeve with laterally projecting portions at one end that are dimensioned to fit the ovate apertures when properly positioned with reference thereto but which prevent its withdrawal when the keeper is turned from that position.

A further objective of the invention is to provide a clamp in which the receiver has a pair of jaws which have transversely alined apertures which register with the hole in the element to permit the keeper to be inserted therethrough in the first position of the ram head and these jaw apertures establish the backing portions of the receiver member and they may be so positioned relative to the ram head as to enable the clamping pressure to be applied by the ram in a downward direction.

Yet another objective of the invention is to provide a clamp in which the receiver has a seat portion engageable by the end of the element and the keeper extends through the element and is connected to the ram head portion to be detached therefrom in the first position thereof with endwise clamping pressure resulting on upward movement of the ram head.

A further objective of the invention is to provide a clamp in which the element end engages a seat portion of the receiver and has spaced wall portions. The ram head portion is in the form of oppositely disposed hooks and there are two transversely spaced keepers extending between the wall portions to be engaged by the hooks on movement of the ram thus to clamp the element end against the receiver portion.

Yet another objective of the invention is to provide such a clamp for use when the element end is provided with a transversely spaced pair of keepers before the hooks are entered therebetween. For such elements, the hook portions are rotatable relative to the ram axis to enable them to be entered between the keepers and then turned into a position engageable therewith and it is preferred to provide means engageable with a keeper or both of them, after the hooks have been entered between them to cause the turning of the hooks into a keeper-engaging position by the relative movement between the element and the hooks.

In the accompanying drawings, there are shown illustrative embodiments of the invention from which these and other of its objectives, novel features, and advantages will be readily apparent.

Figure 1:
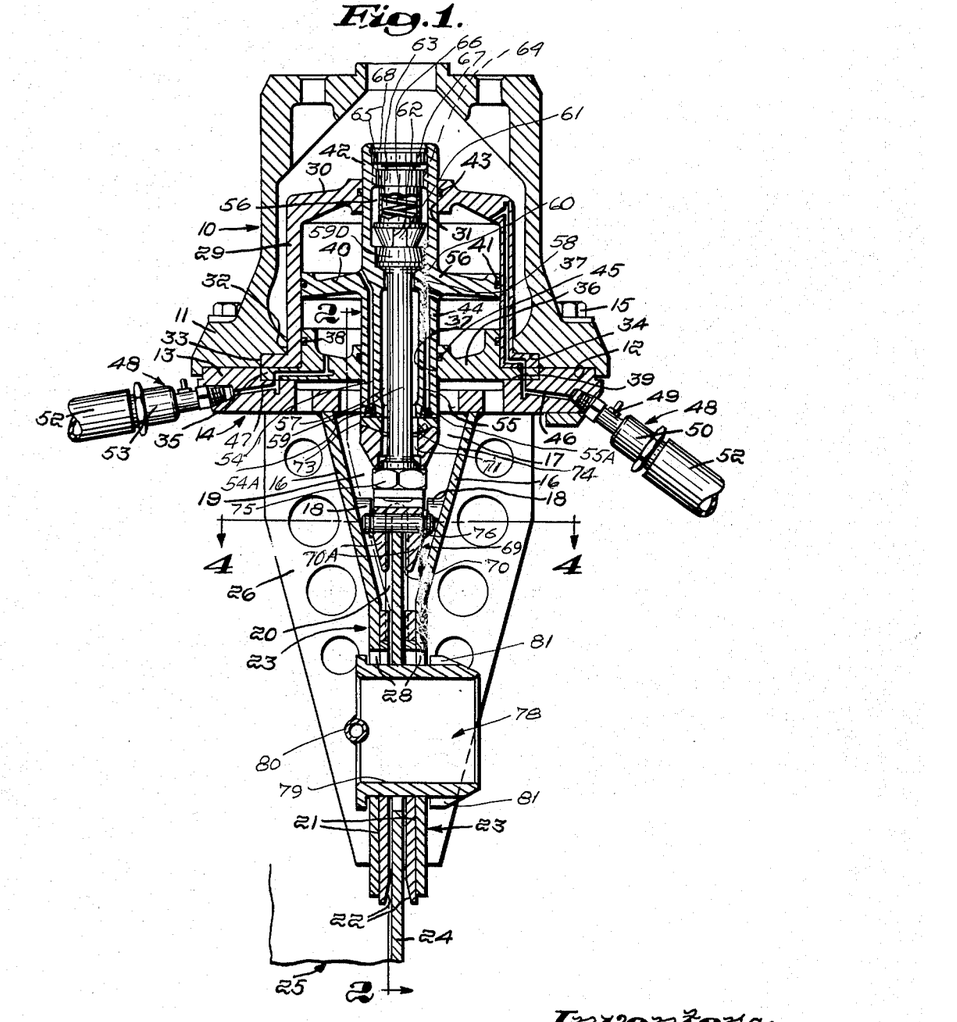
FIGURE 1 is a longitudinal section through a clamp in accordance with the invention.
Figure 2:
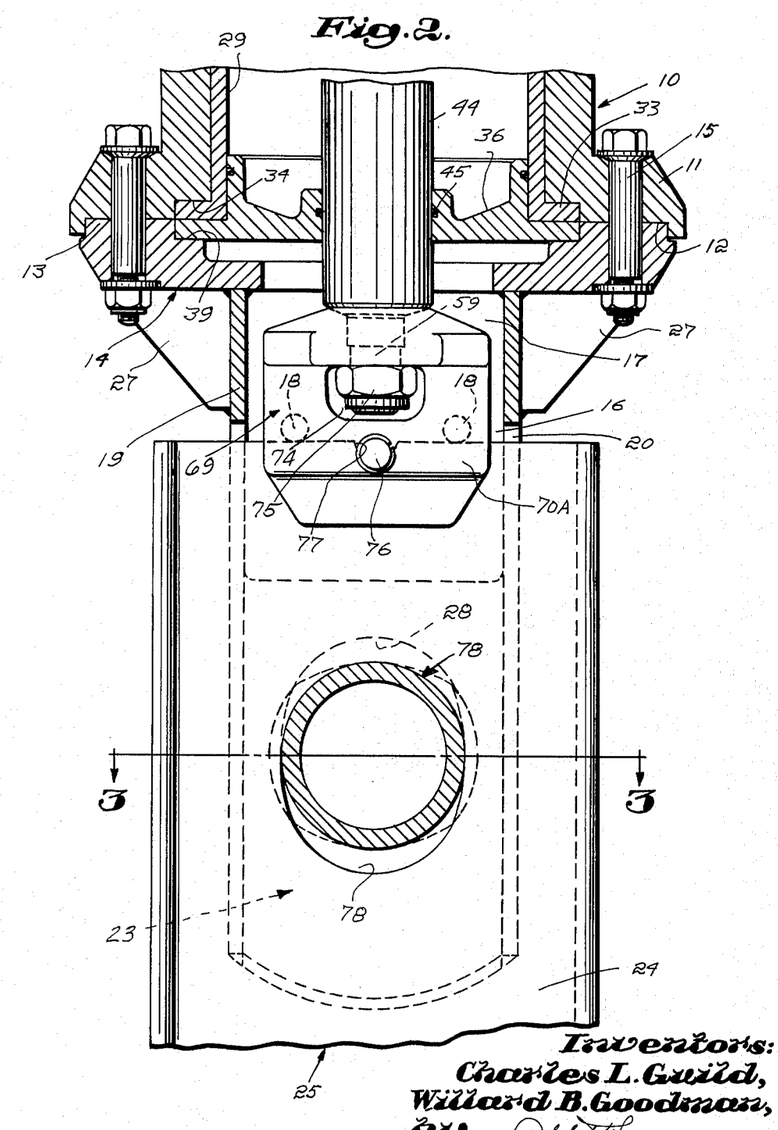
FIGURE 2 is an enlarged, fragmentary section taken approximately along the indicated lines 2—2 of FIGURE 1.
Figure 3:
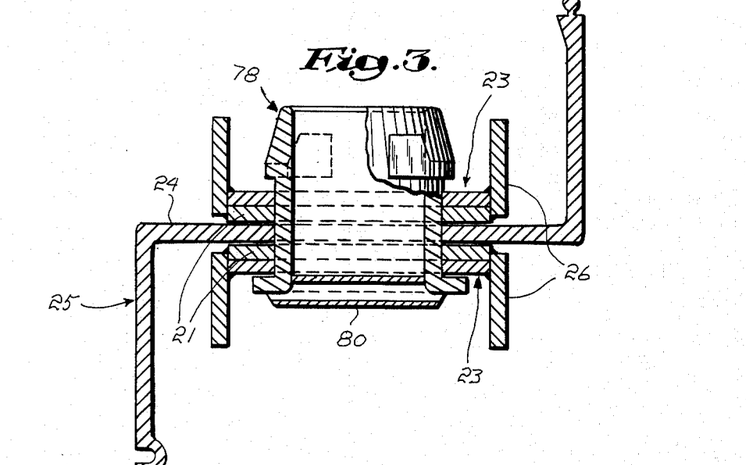
FIGURE 3 is a section taken approximately along the indicated lines 3—3 of FIGURE 2.
Figure 4:
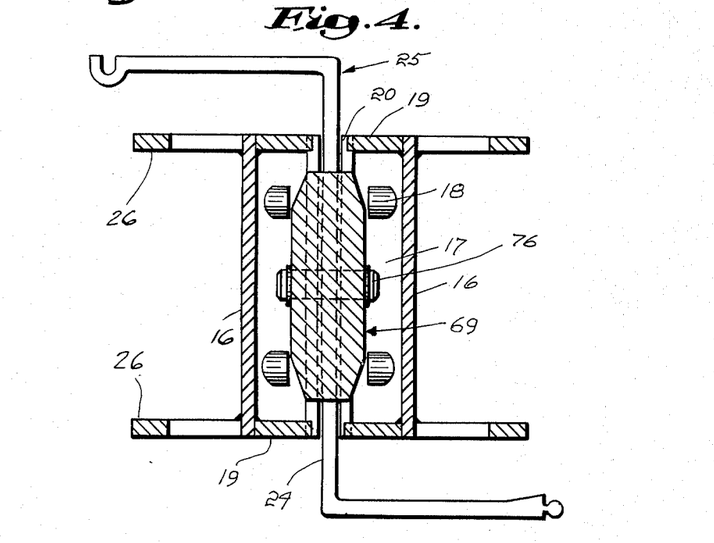
FIGURE 4 is a section, on the scale of FIGURE 2, taken approximately along the indicated lines 4—4 of FIGURE 1.

A mandrel extension attachable to the driving element of the driver, a pile driver for example, is generally indicated at 10 and is illustrated as being in the form of a tubular housing section having an outwardly disposed flange 11 at its lower end. The flanged end of the section 10 is recessed as at 12 to receive the annular portion 13 of the lower clamp or receiver section 14 locked thereto by bolts 15.

The lower section 14 has a pair of depending walls 16 that are inclined towards each other to define an axially located chamber 17 in which the wall members 16 have transversely alined, spaced bosses 18. The wall members are interconnected by end walls 19 each having a downwardly opening slot 20. Below the chamber 17, the wall members 16 are parallel and provided with reinforcements 21 having their lower edges outwardly bevelled as at 22 and define a pair of generally indicated jaws 23 to receive between them a wall of a pile, the wall being shown as the central web 24 of a generally indicated pipe 25, shown as of the Z type. Each of the clamp section walls 16 is backed substantially throughout their entire length, by braces 26 and their end walls 19 are braced at their upper ends as at 27. The jaws 23 has transversely alined apertures 28, the apertures being shown as ovate with their long axis disposed vertically. The bottom portions of the apertures 28 constitute backing portions.

The clamp has a double-acting ram including a cylinder 29 whose end wall 30 has an axial bore 31. The cylinder 29 is dimensioned to fit the annular boss 32 of the upper clamp section 10 and has, at its open end, an outwardly disposed flange 33 dimensioned to fit the seat 34 in the flanged end of the clamp section 10. The flange 33 is engaged by the flange 35 of a cylinder head 36 which has an axial bore 37 and fits the open end of the cylinder 29 and carries a suitable seal 38. The flange 35 is entrant of a seat 39 in the upper face of the lower clamp section 14.

A piston 40 within the cylinder 29 has a seal 41 in sealing engagement therewith and including an axial stem portion 42 extending slidably upwardly through the bore 31 wherein there is a suitable seal 43. The piston 40 also includes an axial stem portion 44 extending slidably downwardly through the axial bore 37 wherein there is a suitable seal 45.

The receiver section 14 has conduits 46 and 47 effecting communication, respectively, between generally indicated fittings 48 and the interior of the cylinder above and below the piston 40. Each fitting 48 is shown as including a manually operable shutoff valve 49 and is preferably of the type having a normally closed check valve which is opened when a complemental coupling element 50 of a fluid delivery line 52 or of a fluid return line 53 is attached thereto. It will be noted that the conduit 46 extends through the cylinder head 36 and lengthwise of the cylinder 29 and opens into the cylinder through its end wall 30, and that the conduit 47 opens through the cylinder head 36. Vents 54 and 55 are provided from opposite faces of the piston 40 and they extend lengthwise of the stem portion 44 and are shown as closed by removable plugs 54A and 55A, respectively.

The upper piston stem portion 42 has an axial chamber 56 connected to an axial chamber 57 in the lower piston stem portion 44 by an axial bore 58 whose diameter is less than that of the chambers 56 and 57. A bolt 59 loosely fits the bore 58 and has a spherical head 59D entrant of a concave seat 60 at the bottom of the chamber 56. The bolt head 59D is also provided with an upwardly disposed transverse blade 61 which fits a slot 62 in a lock 63 held against rotation by a splined connection 64 with the stem portion 42. The lock 63 has an upwardly opening chamber 65 for a compression spring 66 seated against the disc 67 which is held in place by the removable keeper ring 68.

A ram head portion is generally indicated at 69 and is shown as having a downwardly opening channel 70 extending from end-to-end thereof, a bore 71 opening upwardly through a concave seat 72 which is complemental in size and shape to the convex washer 73. The threaded end of the bolt 59 freely extends through the washer 73 and the bore 71 and into a transverse slot 74 in the ram portion which enables a nut 75 to be threaded on the bolt to hold the ram head portion 69 loosely in order that it be self-adjusting when it engages the received pile end. The channel 70 of the ram head portion is traversed by a removable thrust pin 76 supported by the channel defining walls 70A. This construction provides for universal adjustments of the ram head relative to the axis of the ram and enables a pile to be attached thereto even when its axis is not alined with the ram axis but permits the alinement of those axes as is necessary in pile driving before the attached pile is locked to the clamp.

In practice, a pile is seated between the jaws 23 with the thrust pin 76 entrant of a centering notch 77 in the upper edge of the received pile web 24 which also has an ovate aperture 28 spaced below the notch 77 and with its long axis disposed lengthwise of the pile to register with the apertures 28 of the jaws 23 when the ram head portion is in a predetermined raised position. A keeper, generally indicated at 78 is then inserted through the alined apertures and the ram head portion 69 lowered to tightly lock the pile to the clamp with the keeper 78 clamped against the backing surfaces provided by the lower portions of the jaw apertures 28.

In practice, the keeper 78 is in the form of a cylindrical body 79 having at one end a transverse bar 80 providing a handle to facilitate its being inserted through and turned relative to the pile and clamp jaw apertures. The keeper 78 has diametrically disposed portions 81 at its other end insertable through the apertures of the pile and jaws but engaging with a jaw 23 when turned, thus to make its withdrawal impossible.

Figures 5, 6:
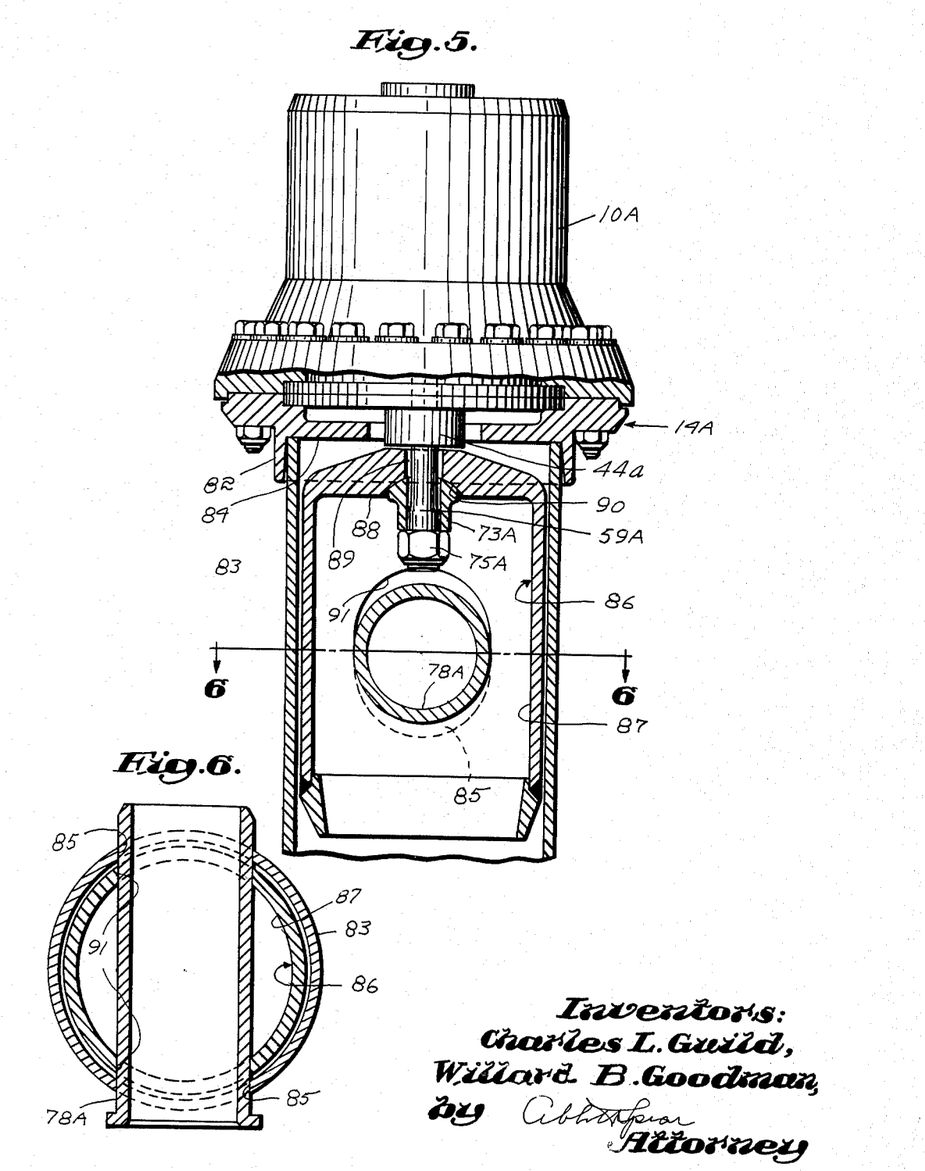
FIGURE 5 is a view, similar to FIGURE 1, illustrating another embodiment of the invention.
FIGURE 6 is a section taken along the indicated lines 6—6 of FIGURE 5.

In the embodiment of the invention illustrated by FIGURES 5 and 6, the upper housing section 10A may be the same as the upper housing section 10. The lower clamp or receiver section 14A is shown as including a downwardly and outwardly tapering annular flange 82 to assist in the entry of the end of a pile 83 against the backing portion 84.

The pile 83 is shown as of the tubular type and has transversely alined holes 85 which are shown as ovate with their long axes disposed vertically.

The double-acting ram within the housing section 10A may be identical to that described in connection with the embodiment of the invention illustrated by FIGURES 1–4 and only the lower end of its stem portion 44A and of its bolt 59A are shown. The ram head portion is generally indicated at 86 and is shown as including a sleeve 87 and an upper end wall 88 provided with an axial bore 89 loosely receiving the bolt 59A. The lower end of the bore 89 is in the form of a concave seat 90 for engagement by the upper end of the washer 73A which is complemental in size and shape and held seated by the nut 75A with a slight clearance between the upper end of the ram head portion 86 and the proximate end of the piston stem portion 44A thus to permit relative movement therebetween.

The sleeve 87 has transversely alined holes 91 shown as ovate with their long axes vertical and in a first position of the ram head portion 86, these register with the holes 85 of the pile to permit the keeper 78A to be inserted therethrough and turned to prevent its withdrawal. When the ram head portion 86 is raised, the keeper 78A is tightly gripped and the pile 83 is clamped endwise securely against the backing portion 84 of the receiver section 14A.

In the embodiment of the invention illustrated by FIGURES 7–14, the upper housing section 10B may be identical to that shown in FIGURES 1 and 5 and this is also true of the double-acting ram located within the section 10B, the downwardly disposed stem portion of its piston being indicated at 44B and its bolt at 59B.

A ram head portion is generally indicated at 92 and it includes a lower part provided with a pair of laterally projecting, upwardly opening hooks 93, an intermediate transverse chamber 94, and an upper part 95 axially of which there is a bore 96 opening into the chamber 94 and formed with a concave seat 97 at its lower end. The bolt 59B extends through the bore 96 and through a convex seat fitting a nut 75B threaded thereon and loosely supporting the ram head portion to permit relative movement between it and its stem 44B.

The lower clamp or receiver section 14B preferably has tapered lugs 98 depending from the backing portion 99 engageable by the upper end of a pile 100, shown as H-shaped in cross section and having its central web 101 cut away as at 102 to accommodate the ram head portion 92 between its walls 103, each having a pair of laterally spaced apertures 104 transversely alined with appropriate ones of those of the other wall and through which extend keepers 78B. In practice, either the keepers 78B are inserted when the ram head portion is in place in the pile or the keepers are inserted before the pile is seated against the backing portion 99. In that case, the pile is turnd 90° after the ram head portion 92 has been introduced between the keepers 78B, or the ram head portion is turned relative to the pile to bring the hooks 93 into keeper engaging position. In any event, the ram head portion 92 is raised from its first position to clamp the end of the pile 100 securely against the backing portion 99.

As it is far more convenient to insert the keepers before the end of the pile or other element is raised into clamping position than it is when the pile is thus positioned and as it is easier to turn the ram head portion than it is the pile, the ram head portion 92 is provided with a pair of laterally projecting cams 105. These are positioned so that after the hooks 93 have passed between the keepers 78B, the cams 105 engage the keepers 78B and turn the ram head portion 92, on further relative movement between it and the pile, into a position in which the hooks 93 engage the keepers 78B on upward movement of the ram.

Figure 7:
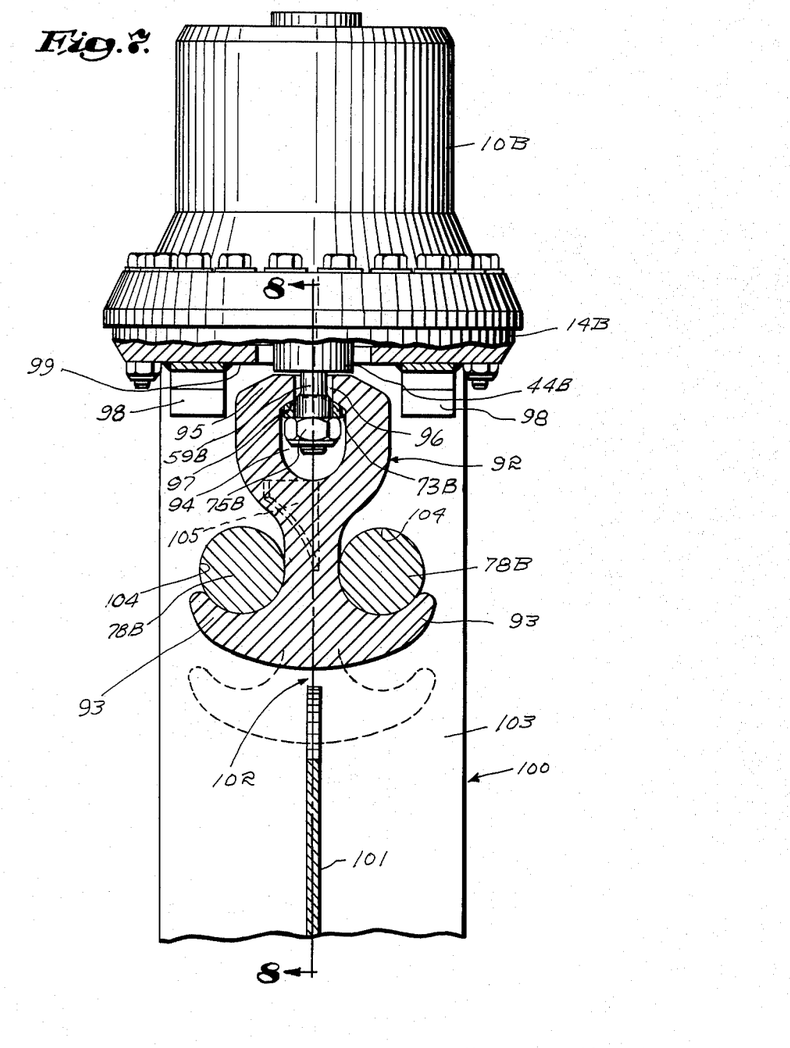
FIGURE 7 is a view, generally similar to FIGURES 1 and 5, illustrating yet another embodiment of the invention.
Figure 8:
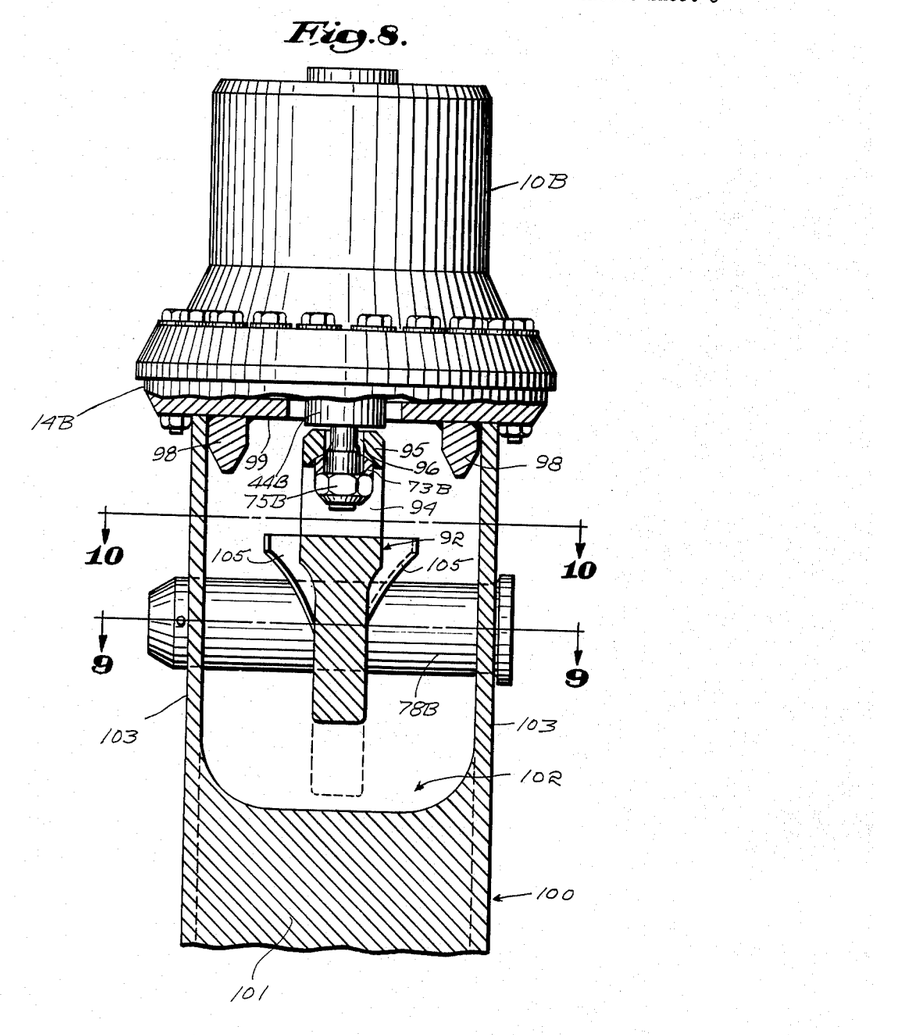
FIGURE 8 is a view similar to FIGURE 6 but taken at right angles thereto.
Figure 9:
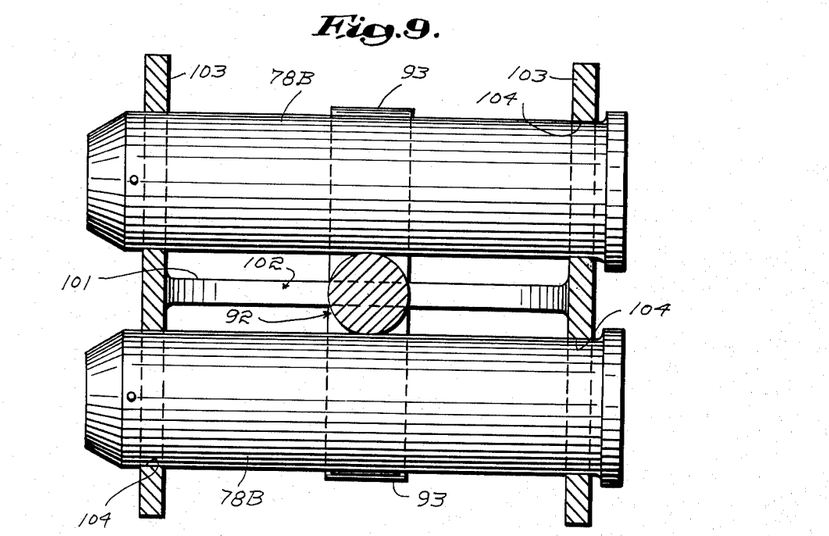
FIGURES 9 and 10 are sections taken, respectively, along the indicated lines 9—9 and 10—10 of FIGURE 8.
Figure 10:
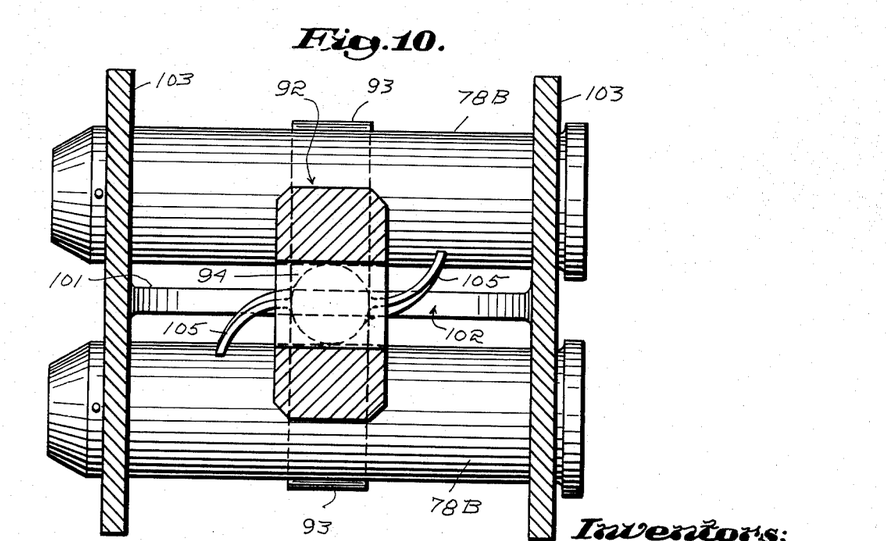
Figure 11:
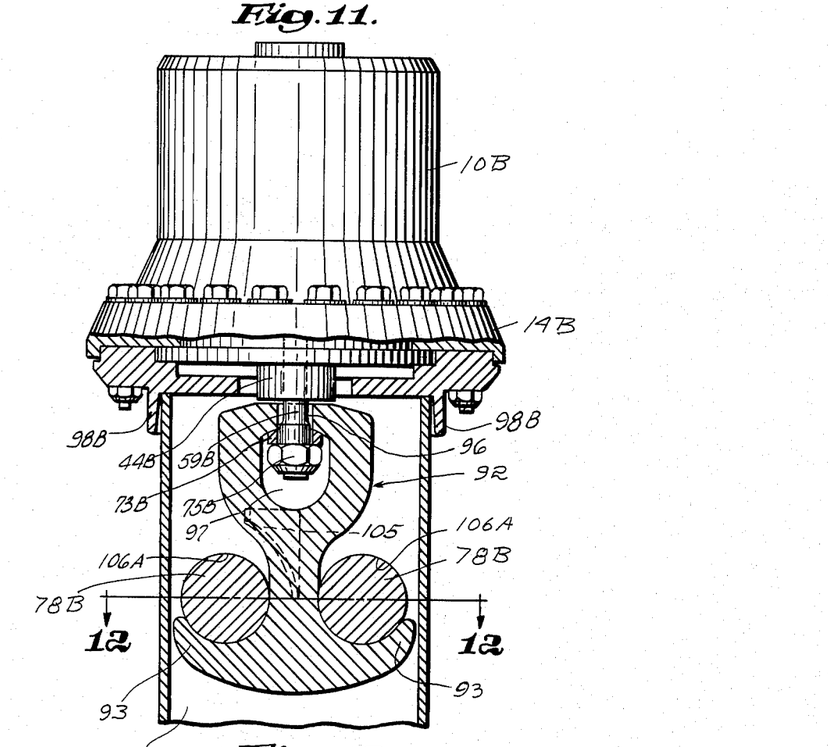
FIGURE 11 is a view of the clamp shown in FIGURES 7–10 holding a tubular pile.
Figure 12:
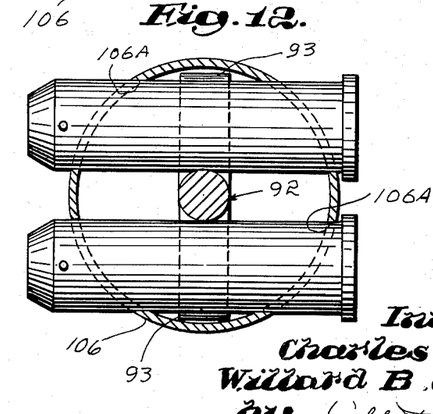
FIGURE 12 is a section taken approximately along the indicated lines 12—12 of FIGURE 11.
Figure 13:
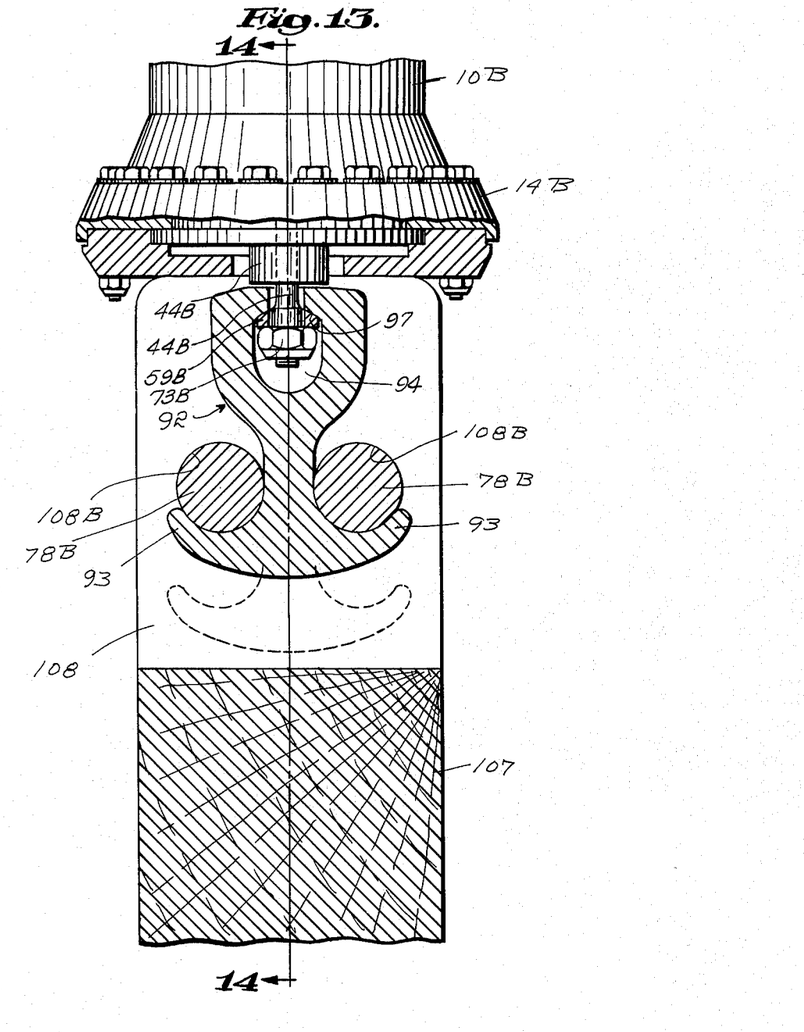
FIGURE 13 is a view similar to FIGURE 11 showing the use of the clamp with a wood pile.
Figure 14:
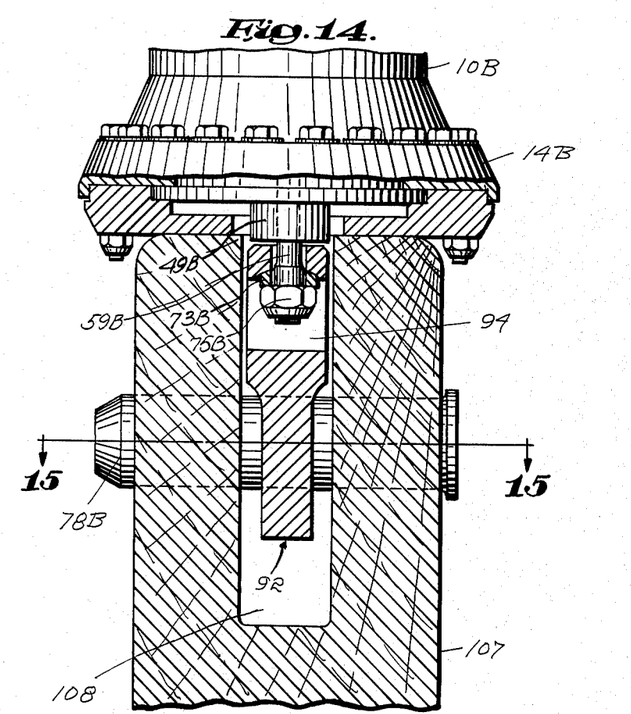
FIGURE 14 is a section taken approximately along the indicated lines 14—14 of FIGURE 13.
Figure 15:
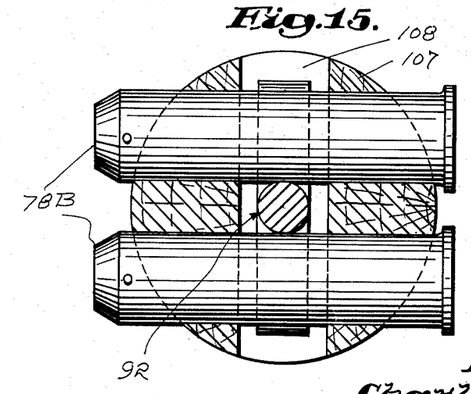
FIGURE 15 is a section taken approximately along the indicated lines 15—15 of FIGURE 14.

The clamp as thus far described is illustrated by FIGURES 7–10 but it may be used with piles or earth entering elements of other cross sectional shapes. In FIGURES 11 and 12, by way of example, it is shown as having a tubular element 106 clamped thereto and having pairs of transversely alined, laterally spaced holes 106A for the keepers 78B. It is preferred that its backing portion 99 be outlined by a circular, depending flange 98B. In FIGURES 13–15, the clamp of FIGURE 7 is shown with a wooden pile 107 clamped thereto with its upper end slotted as at 108 to receive the ram head portion 92 and having transversely alined pairs of holes 108B for the keepers 78B.

It will thus be apparent that the invention makes possible the endwise clamping of piles or other earth entering elements of a wide variety of cross-sectional shapes that is secure in driving or withdrawing them.

We claim:

1. In combination, a pile having at least one hole opening through the sides thereof at its upper end, and a clamp for attaching said pile to the driving element of a pile driver, said clamp including a receiver provided with at least one backing portion, a double-acting ram within said receiver, said ram including a ram head portion movable by said ram axially relative to said backing portion from a first position, one of said portions being engageable with said pile end on such movement, and a connection between said pile end and the other of said portions, said connection including a transverse member in said pile hole in engagement with said other portion, said connection being loose and disengageable in said first position and tightly interengaged on such movement of said ram head portion with said upper pile end then seated and clamped against said backing portion of said receiver.

2. The combination of claim 1 in which the ram head portion is the portion engageable with the pile end and the connection is between the pile and the backing portion of the receiver.

3. The combination of claim 1 in which the backing portion of the receiver is the portion engageable by the pile end and the connection is between the pile and the ram head portion.

4. The combination of claim 1 in which the ram head portion is rotatable relative to the ram.

5. In combination, a pile and a clamp for attaching said pile to the driving element of a pile driver, said clamp including a receiver provided with at least one backing portion, a double-acting ram within said receiver, said ram including a ram head portion movable axially by said ram relative to said backing portion from a first position, one of said portions being engageable with the pile end on such movement, said pile and the other of said portions having transverse holes which are transversely alined and a keeper extending through said holes, said keeper and said holes being so dimensioned that said keeper is loose and disengageable in said first position and tightly interengaged on such movement of said ram head portion with said pile end then sealed and clamped against said backing portion of said receiver.

6. The combination of claim 5 in which the holes are ovate and have their long axes disposed in a direction lengthwise of the pile and the keeper is cylindrical with its diameter being approximately equal to the short axes of the holes thereby to permit relative axial movement between the pile and the portion connected thereto.

7. In combination, a pile having an end wall provided with a transverse hole below the upper end thereof, and a clamp for attaching the pile to the driving element of a pile driver, said clamp including a receiver including a pair of spaced jaws between which said pile wall is located and which having transversely alined holes defining backing portions, a double-acting ram within said receiver including a ram head movable between elevated and lowered positions, said ram head including a thrust portion engageable with the upper end of the received pile wall, the holes in the jaws being registerable with the hole in the pile wall when said ram head is in an elevated position, and a keeper loosely fitting said holes in said elevated position, said keeper being engaged by the upper portion of the hole in the pile wall and clamped against the backing portions when said ram head is in a lowered position.

8. In combination, a pile having an end wall provided with a transverse hole below the upper end thereof and a clamp for attaching the pile to the driving element of a pile driver, said clamp including a receiver including a pair of spaced jaws between which said pile wall is located and which have transversely alined holes defining backing portions, a double-acting ram within said receiver including a ram head movable between elevated and lowered positions, said ram head including a pile wall-receiving channel portion, a thrust member disposed transversely of said channel for engagement with the upper end of the received pile wall, the holes in the jaws being registerable with the hole in the pile wall when said ram head is in an elevated position, and a keeper loosely fitting said holes in said elevated position, said keeper being engaged by the upper portion of the hole in the pile wall and clamped against the backing portions when said ram head is in a lowered position.

9. In combination, a pile having an end wall provided with a transverse hole below the upper end thereof and a clamp for attaching the pile to the driving element of a pile driver, said clamp including a receiver including a pair of spaced jaws between which said pile wall is located and which have transversely alined holes defining backing portions, a double-acting ram within said receiver including a piston stem, a bolt supported at its upper end by said stem and extending downwardly freely through said stem axially thereof with its free end below said stem, a washer on the free end of said bolt, a ram head movable by said ram between elevated and lowered positions, said ram head including a washer engaging portion having a bore through which said bolt extends and a thrust portion engageable with the upper end of the received pile wall, a nut locking said head to said bolt, the holes in the jaws being registerable with the hole in the pile wall when said ram head is in an elevated position, and a keeper loosely fitting said holes in said elevated position, said keeper being engaged by the upper portion of the hole in the pile wall and clamped against the backing portions when said ram head is in a lowered position.

10. The combination of claim 9 in which the lower portion of the washer is convex and the washer-engaging portion of the ram head is concave.

11. In combination, a pile having an end wall provided with a transverse hole below the upper end thereof and a clamp for attaching said pile to the driving element of a pile driver, said clamp including a receiver including a pair of walls downwardly inclined towards each other and defining a housing and with their ends parallel and defining spaced jaws between which said pile wall is located, said jaws having transversely alined holes defining backing portions, a double-acting ram within said receiver including a ram head within said housing, said ram head including a thrust portion engageable with the upper end of said pile wall and movable by said ram between elevated and lowered positions, the holes of the jaws being registerable with the hole in the pile wall when said ram head is in an elevated position, and a keeper loosely fitting said holes in said elevated position, said keeper being engaged by the upper portion of the hole in the pile wall and clamped against the backing portions when said ram head is in a lowered position.

12. In combination, a pile of a type that has spaced wall portions at least at one end, and a clamp for attaching said pile to the driving element of a pile driver, said clamp including a receiver including a backing portion, a double-acting ram within said receiver including a ram head movable axially relative to said backing portion from a first position and including a portion between the pile wall portions, and a connection between said pile wall portions and said ram head portion, said connection including a member extending through said upper end of said pile transversely thereof, said connection being loose and disengageable in said first position and tightly interengaged on such movement of said ram head portion with said pile end then seated and clamped against said backing portion of said receiver.

13. In combination, a pile of a type that has spaced wall portions at least at one end, and a clamp for attaching said pile to the driving element of a pile driver, said clamp including a receiver provided with a backing portion, a double-acting ram within said receiver, said ram including a ram stem, a bolt supported by said stem for universal movement relative thereto and extending axially thereof, a ram head including an upper end wall through which said bolt freely extends and which is spaced from said stem, means locking said wall to said bolt, said ram head being movable axially relative to said backing portion between elevated and lowered positions, said ram head being between said wall portions of said pile, and a connection between said pile wall portions and said ram head, said connection including a member extending through said ram head and said pile end, said connection being loose and disengageable in said first position and tightly interengaged on such movement of said ram head portion with said pile end then seated and clamped against said backing portion of said receiver.

14. The combination of claim 13 in which the ram head has a concave seat in the lower surface of its end wall through which the bolt extends, and the locking means including a washer provided with a convex seat-engaging face.

15. In combination, a pile of the type that has spaced wall portions at least at the upper end thereof and a clamp for attaching said pile to the driving element of a pile driver, said clamp including a receiver, said receiver including a backing portion, a double-acting ram within said receiver including a ram head portion movable axially relative to said backing portion between elevated and lowered positions, said ram head including a hook between the wall portions of said pile, and a pin extending transversely between said wall portions of said pile adjacent the upper end thereof and above said hook in an elevated position of said ram head, said pin being engaged by said hook and said pile end clamped against said backing portion.

16. In combination, a pile of the type that has spaced wall portions at least at one end and a clamp for attaching said pile to the driving element of a pile driver, said clamp including a receiver including a backing portion, a double-acting ram within said receiver including a ram head portion rotatable relative to said ram and movable axially relative to said backing portion between elevated and lowered positions, said ram head including a hook between the wall portions of said pile, and a pin extending transversely between said wall portions of said pile adjacent the upper end thereof and above said pin in an elevated position of said ram head, said pin being out of the path of said hook when said head is turned into one position and engaged by said hook when turned approximately 90° from said one position and said pile end then clamped against said backing portion of said receiver.

17. In combination, a pile of the type that has spaced wall portions at least at one end and a clamp for attaching said pile to the driving element of a pile driver, said clamp including a receiver and including a backing portion, a double-acting ram within said receiver including a ram head movable axially relative to said backing portion between lowered and elevated positions, said ram head including a pair of oppositely disposed and laterally spaced hooks between the wall portions of said pile, and laterally spaced pins extending transversely between said wall portions of said pile adjacent the upper end thereof, each above a respective one of said hooks in an elevated position of said ram head, said pins and hooks being interengaged and said pile end clamped against said backing portion of said receiver.

18. In combination, a pile of the type that has spaced wall portions at least at one end, and a clamp for attaching said pile to the driving element of a pile driver, said clamp including a receiver including a backing portion, a double-acting ram within said receiver including a rotatable ram head movable axially relative to said backing portion between lowered and elevated positions, said ram head including a pair of oppositely disposed and laterally spaced hooks between the wall portions of said pile, laterally spaced pins extending transversely between said wall portions of said pile adjacent the upper end of said pile, each above a respective one of said hooks and out of the path thereof when said head is turned into one position and, in an elevated position of said ram head and with said head turned approximately 90° from said one position, said pins and hooks being interengaged and said pile end seated and clamped against said backing portion of said receiver, and laterally projecting cams carried by said ram head above said hooks engaging said pins and positioning said ram head approximately 90° from said one position.

References Cited by the Examiner
UNITED STATES PATENTS

| | | | |
|---|---|---|---|
| 1,888,752 | 11/1932 | Wemlinger | 61—60 |
| 2,736,600 | 2/1956 | Carlson | 294—88 |
| 2,877,575 | 3/1959 | Stedt | 294—88 |
| 2,890,906 | 6/1959 | Jacquart | 294—86 |
| 2,963,090 | 12/1960 | Cole et al. | 294—86 |
| 2,963,310 | 12/1960 | Abolins | 294—86 |
| 2,996,887 | 8/1961 | Rice et al. | 61—53.7 |
| 3,019,608 | 2/1962 | Marmlon | 61—63 |
| 3,101,956 | 8/1963 | Muller | 175—56 |

CHARLES E. O'CONNELL, *Primary Examiner.*

EARL J. WITMER, *Examiner.*